G. SKOGLUND.
ARTIFICIAL LIMB.
APPLICATION FILED MAY 12, 1920.
1,350,743. Patented Aug. 24, 1920.
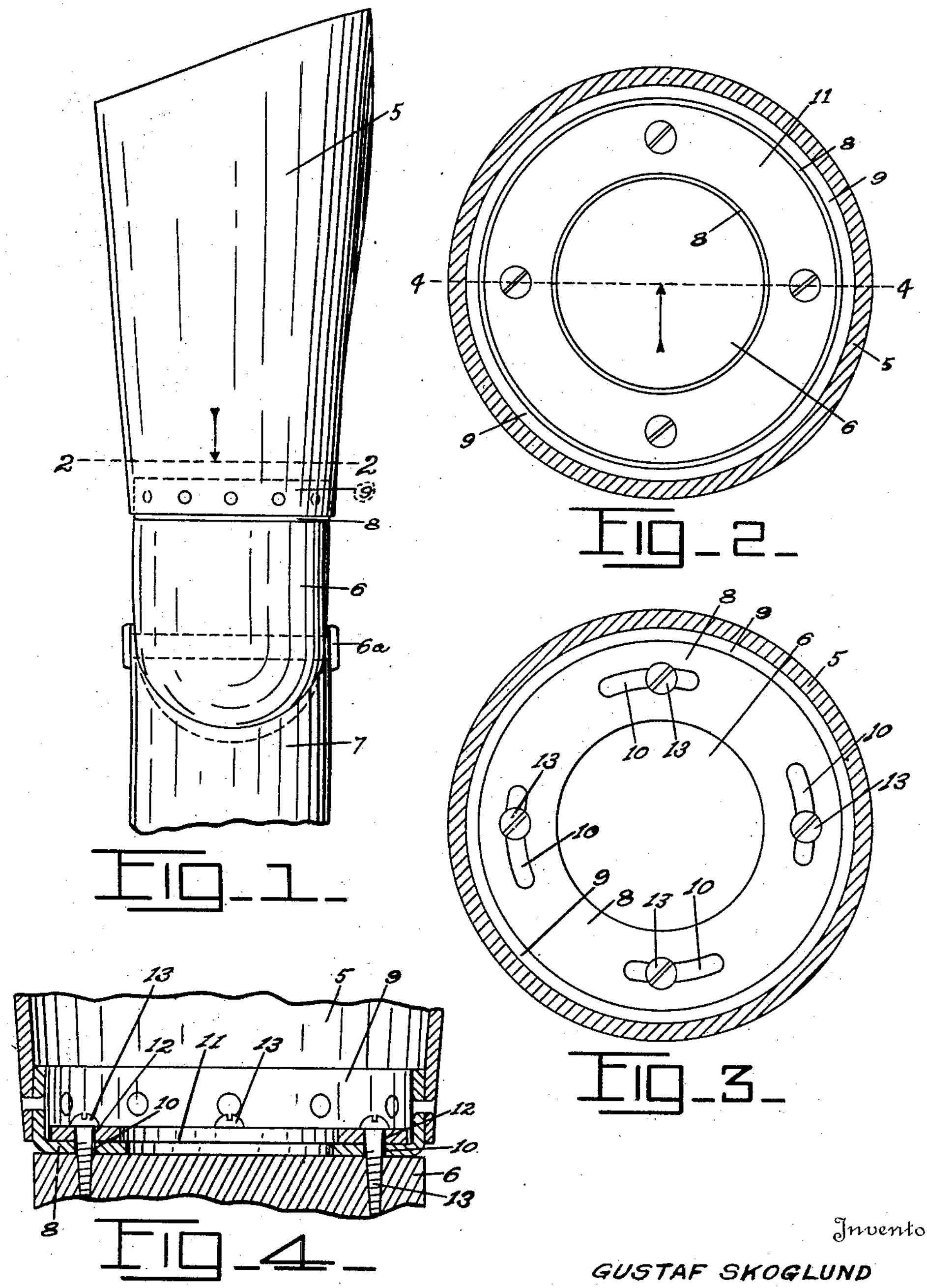
Inventor
GUSTAF SKOGLUND
By A. E. Carlsen.
Attorney

UNITED STATES PATENT OFFICE.

GUSTAF SKOGLUND, OF MINNEAPOLIS, MINNESOTA.

ARTIFICIAL LIMB.

1,350,743. Specification of Letters Patent. Patented Aug. 24, 1920.

Application filed May 12, 1920. Serial No. 380,797.

*To all whom it may concern:*

Be it known that I, GUSTAF SKOGLUND, a citizen of the United States, residing at Minneapolis, in the conuty of Hennepin and State of Minnesota, have invented certain new and useful Improvemnts in Artificial Limbs, of which the following is a specification.

This invention relates to artificial limbs and the object is to provide an improved form of limb construction in which an adjustable joint is provided whereby the adjacent limb members may be more easily and readily turned or adjusted relative to each other than has been permitted by the constructions used heretofore. The invention is clearly illustrated in the accompanying drawing, in which:

Figure 1 is a portion of an artificial leg embodying my invention.

Fig. 2 is an enlarged sectional view on the line 2—2 in Fig. 1.

Fig. 3 is a view similar to Fig. 2 but with the plate 11 removed.

Fig. 4 is a sectional view on the line 4—4 in Fig. 2.

Referring to the drawing by reference numerals 5 designates a hollow thigh member and 6 a knee member to which is pivotally secured by a bolt $6^a$ a shin member 7. My improved joint connects the thigh member 5 to the knee member 6, and consists of a circular plate 8 having a flange 9 which is riveted to the inner side of the thigh member. The plate 8 is provided with a number of arc shaped slots 10 and is substantially covered by a heavy circular securing plate 11 which is provided with holes 12 directly over the slots 10. Screws 13 engage the holes 12 and the slots 10 and then screw into the knee member 6 and thus firmly secure the thigh and knee members together in rigid position.

It is frequently found necessary in the constructing and fitting of artificial limbs to turn one member slightly relative to the adjacent part in order to cause the limb to appear as natural as possible. This readjusting has heretofore been a difficult task and one requiring considerable time. With my construction, however, it is only necessary to loosen the screws 13 with a screwdriver which may be manipulated from within the thigh member 5 and then turn the member to the position desired when the screws may again be tightened. The plate 11 has for its object to reinforce the joint by spreading the pressure of the screw heads over the entire plate 8.

It is understood that modifications in the form and construction of this joint may be made if within the scope of the appended claims. Having now therefore fully shown and described my invention what I claim to be new and desire to protect by Letters Patent is:

1. In an artificial limb, two adjacent limb members, a plate having a flange adapted to be fixed to one of said members, said plate having arc shaped slots therein, adjusting screws adapted to engage said slots and be secured in the other limb member.

2. In an artificial limb, two adjacent limb members, a plate having a flange adapted to be fixed to one of said members, said plate having arc shaped slots therein, a reinforcing plate positioned adjacent the inner side of said first mentioned plate and having holes corresponding in position to said slots, headed screw members extending through said holes and slots and adapted to fasten in the other limb member, the screw heads engaging said reinforcing plate.

In testimony whereof I affix my signature

GUSTAF SKOGLUND